(12) United States Patent
Alonso-Miralles

(10) Patent No.: US 11,834,162 B2
(45) Date of Patent: Dec. 5, 2023

(54) ACOUSTIC SYSTEMS AND METHODS FOR URBAN AIR MOBILITY VEHICLES

(71) Applicant: ROHR, INC., Chula Vista, CA (US)

(72) Inventor: Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 237 days.

(21) Appl. No.: 17/239,001

(22) Filed: Apr. 23, 2021

(65) Prior Publication Data
US 2022/0340273 A1 Oct. 27, 2022

(51) Int. Cl.
| B64C 27/20 | (2023.01) |
| B64C 1/40 | (2006.01) |
| B64C 29/00 | (2006.01) |
| B64C 11/00 | (2006.01) |

(52) U.S. Cl.
CPC ............... B64C 27/20 (2013.01); B64C 1/40 (2013.01); B64C 11/001 (2013.01); B64C 29/0016 (2013.01)

(58) Field of Classification Search
CPC ........................ B64C 11/001; B64D 2033/0206
See application file for complete search history.

(56) References Cited

U.S. PATENT DOCUMENTS

| 2,028,985 | A | * | 1/1936 | Mahon | F04D 29/646 |
| | | | | | 415/119 |
| 3,101,917 | A | * | 8/1963 | Sudrow | B64C 11/001 |
| | | | | | 244/23 C |
| 3,605,672 | A | * | 9/1971 | Strumbos | B64C 9/38 |
| | | | | | 114/166 |
| 5,702,230 | A | * | 12/1997 | Kraft | F02K 1/827 |
| | | | | | 381/71.7 |
| 5,743,488 | A | * | 4/1998 | Rolston | F02C 7/045 |
| | | | | | 244/53 B |
| 6,244,817 | B1 | | 6/2001 | Ngo | |
| 6,896,095 | B2 | * | 5/2005 | Shah | F01P 5/06 |
| | | | | | 181/198 |
| 7,472,863 | B2 | * | 1/2009 | Pak | B64D 35/04 |
| | | | | | 244/12.5 |
| 7,874,513 | B1 | * | 1/2011 | Smith | B64C 11/001 |
| | | | | | 244/12.4 |
| 9,592,918 | B2 | * | 3/2017 | Yu | B64D 33/06 |

(Continued)

FOREIGN PATENT DOCUMENTS

| CN | 104454656 A | * | 3/2015 |
| CN | 111075734 A | * | 4/2020 |

(Continued)

OTHER PUBLICATIONS

European Patent Office, European Search Report dated Aug. 17, 2022 in Application No. 22167868.3.

*Primary Examiner* — Joseph W Sanderson
(74) *Attorney, Agent, or Firm* — SNELL & WILMER L.L.P.

(57) ABSTRACT

An acoustic system for an Urban Air Mobility (UAM) vehicle may comprise: a first shroud configured to be disposed around a rotor of the UAM vehicle, the first shroud comprising: a radially inner wall configured to be spaced radially outward from a blade tip of a rotary blade of the rotor, the radially inner wall including a perforated portion; and a hollow chamber defined by an internal surface of the first shroud and the radially inner wall.

16 Claims, 4 Drawing Sheets

(56) References Cited

U.S. PATENT DOCUMENTS

| | | | |
|---|---|---|---|
| 9,741,331 B1 | 8/2017 | Alam et al. | |
| 9,970,443 B2* | 5/2018 | Chang | F04D 29/665 |
| 10,040,548 B2 | 8/2018 | Alzahrani | |
| 10,131,443 B2* | 11/2018 | Namgoong | F02C 7/045 |
| 10,323,655 B2* | 6/2019 | Arima | F04D 25/0613 |
| 10,714,069 B1 | 7/2020 | Ratner | |
| 11,097,828 B2* | 8/2021 | Rowe | B64C 11/001 |
| 11,293,446 B2* | 4/2022 | Takemoto | F04D 19/002 |
| 11,377,198 B2* | 7/2022 | Konishi | G10K 11/17857 |
| 2003/0183446 A1* | 10/2003 | Shah | F15D 1/02 |
| | | | 181/205 |
| 2012/0043413 A1* | 2/2012 | Smith | B64C 29/0033 |
| | | | 244/12.4 |
| 2015/0367953 A1* | 12/2015 | Yu | B64D 33/06 |
| | | | 181/290 |
| 2016/0017895 A1* | 1/2016 | Chang | F04D 29/663 |
| | | | 415/119 |
| 2017/0001730 A1* | 1/2017 | Namgoong | B64D 33/02 |
| | | | 381/71.7 |
| 2017/0227020 A1* | 8/2017 | Arima | F04D 25/0613 |
| 2019/0106204 A1* | 4/2019 | Konishi | B64C 39/024 |
| 2020/0149535 A1* | 5/2020 | Takemoto | F04D 29/665 |
| 2020/0164962 A1 | 5/2020 | Rowe et al. | |
| 2022/0340271 A1* | 10/2022 | Alonso-Miralles | B64C 27/20 |

FOREIGN PATENT DOCUMENTS

| | | | | |
|---|---|---|---|---|
| EP | 2784329 A1 * | 10/2014 | | F04D 29/4213 |
| KR | 1790281 | 10/2017 | | |
| KR | 102214181 B1 * | 2/2021 | | F04D 29/4213 |

* cited by examiner

ACOUSTIC SYSTEMS AND METHODS FOR URBAN AIR MOBILITY VEHICLES

FIELD

The present disclosure relates to acoustic systems and methods, and more specifically, to acoustic systems and methods for Urban Air Mobility (UAM) vehicles.

BACKGROUND

Urban Air Mobility (UAM) vehicles, or Air Taxis, is a fast developing technology forecasted to operate in major U.S. cities in 2030. UAM vehicles may be much quieter relative to helicopters. Due to still being in preliminary development, various obstacles to wide adoption of UAM vehicles still remain.

SUMMARY

An acoustic system for an Urban Air Mobility (UAM) vehicle is disclosed herein. The acoustic system may comprise: a first shroud configured to be disposed around a rotor of the UAM vehicle, the first shroud comprising: a radially inner wall configured to be spaced radially outward from a blade tip of a rotary blade of the rotor, the radially inner wall including a perforated portion; and a hollow chamber defined by an internal surface of the first shroud and the radially inner wall.

In various embodiments, the perforated portion extends from a bottom end of the first shroud toward a top end of the first shroud. A height of the perforated portion may be between 0.5 times a radially inner wall height and 1 times the radially inner wall height. A height of the shroud may be up to a diameter of a rotary blade of the rotor. The system may further comprise an acoustic liner coupled to the internal surface of the first shroud. The acoustic system may further comprise a second shroud configured to be disposed around a second rotor and a third shroud configured to be disposed around a third rotor, the second shroud and the third shroud in accordance with the first shroud. The acoustic system may further comprise a fourth shroud configured to be disposed around a third rotor, the fourth shroud in accordance with the first shroud.

A rotor system for an Urban Air Mobility (UAM) vehicle is disclosed herein. The rotor system may comprise: a central hub; a drive shaft operably coupled to the central hub; at least two rotary blades extending radially outward from the drive shaft; a shroud disposed radially outward from the at least two rotary blades, the shroud being annular in shape, the shroud including a hollow chamber, the shroud comprising a radially inner wall disposed proximate a blade tip of the at least two rotary blades, the radially inner wall including a perforated portion.

In various embodiments, the hollow chamber is configured to act as a resonating chamber. The rotor system may further comprise at least two struts extending from the central hub radially outward to the shroud. A height of the shroud may be up to a diameter of the at least two rotary blades of the rotor. The perforated portion may extend from the bottom end of the radially inner wall towards the top end of the radially inner wall. The rotor system may further comprise an acoustic liner disposed on an internal surface of the shroud. The radially inner wall and the acoustic liner may define the hollow chamber.

An Urban Air Mobility (UAM) vehicle is disclosed herein. The UAM vehicle may comprise: an airframe defining a cabin; and a propulsion system comprising a plurality of rotor systems, each rotor system including: a central hub; a drive shaft operably coupled to the central hub; at least two rotary blades configured to rotate about the central hub; and a shroud having an acoustic system, the acoustic system configured to at least one of noise reduction and noise attenuation.

In various embodiments, the shroud comprises a hollow chamber and a radially inner wall, the radially inner wall including a perforated portion. The shroud may be disposed radially outward of the at least two rotary blades, the shroud being annular in shape. The UAM vehicle may further comprise an acoustic liner disposed in a hollow chamber of the shroud. The UAM vehicle may further comprise a plurality of support arms, each support arm configured to structurally support the rotor system in the plurality of rotor systems. The plurality of support arms may extend outward from the airframe to the plurality of rotor systems.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
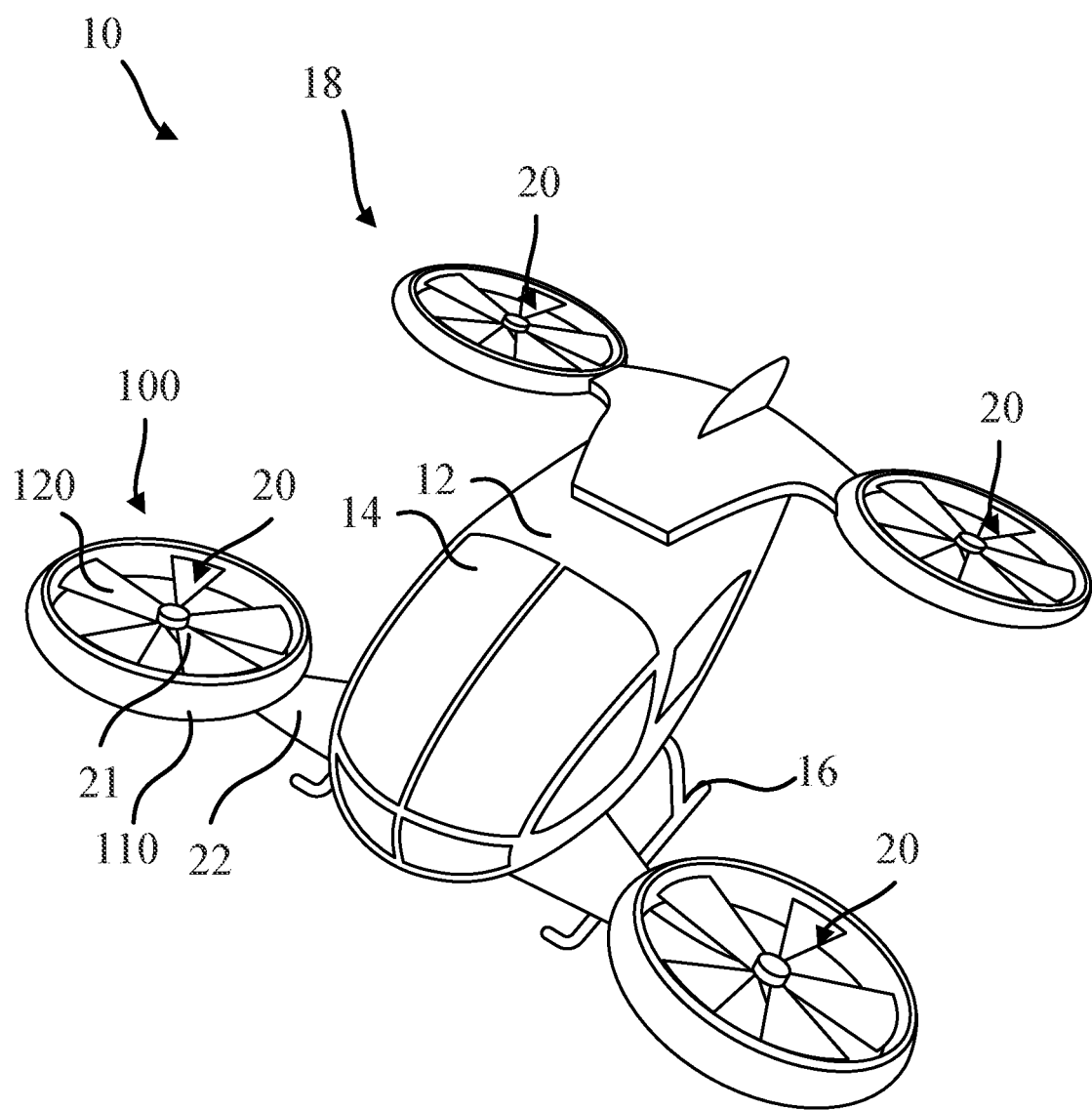
FIG. 1 illustrates a perspective view of an Urban Air Mobility vehicle, in accordance with various embodiments.

Referring now to FIG. 1, a perspective view of an Urban Air Mobility (UAM) vehicle 10 may include an airframe 12 defining a cabin 14, landing skids 16, and a propulsion system 18. Although illustrated as including landing skids 16, any type of landing gear is within the scope of this disclosure. In various embodiments, the propulsion system 18 includes a plurality of rotor systems 20. Although illustrated as including four rotor systems 20, any number of rotor systems is within the scope of this disclosure.

In various embodiments, each rotor system in the plurality of rotor systems 20 may be configured for a fixed angle of attack (i.e., including a rotor configured to maintain a same plane relative to the airframe 12) or configured for a variable angle of attack (i.e., including a rotor configured to operate in variable planes relative to the airframe 12). In this regard, each rotor system in the plurality of rotor systems 20 may be moveable over any number of degrees of freedom. For example, each rotor system in the plurality of rotor systems 20 may be configured to vary pitch, roll, and/or yaw of a respective rotor in the plurality of rotor system 20.

In various embodiments, the UAM vehicle 10 may further comprise a support arm 22 for each rotor system in the plurality of rotor system 20. For example, a first rotor system 21 in the plurality of rotor systems 20 includes a support arm 22 extending outward from the airframe 12 to a shroud 110 of an acoustic system 100. In various embodiments, the support arm 22 extends outward in a horizontal direction (e.g., parallel to a ground surface when UAM vehicle 10 is on the ground surface+/−30 degrees). Although described herein as being +/−30 degrees from a ground surface, the present disclosure is not limited in this regard. For example, one skilled in the art may recognize various angles for a support arm 22 and still be within the scope of this disclosure. The support arm 22 may couple a rotor system (e.g., first rotor system 21) to the airframe 12, in accordance with various embodiments.

In various embodiments, the UAM vehicle 10 further comprises an acoustic system for each rotor system in the plurality of rotor system 20. For example, UAM vehicle 10 includes the acoustic system 100 for the first rotor system 21. The acoustic system 100 includes a shroud 110 disposed radially outward from a rotor 120 of first rotor system 21. In various embodiments, the acoustic system 100 is configured to reduce sound radiation (i.e., a decibel (dB) level) below and/or outward from the UAM vehicle 10. "Below" as defined herein refers to a direction towards a ground surface when the UAM vehicle 10 is on a ground surface (e.g., when landing skids 16 are in contact with the ground surface). In this regard, the acoustic system 100 is configured to re-direct and/or at least partially dissipate rotor noise, in accordance with various embodiments. In various embodiments, by utilizing acoustic system 100 as described herein, the UAM vehicle 10 may be significantly quieter than a UAM vehicle without the acoustic system 100 for each rotor in the plurality of rotor systems 20.

Figure 2:
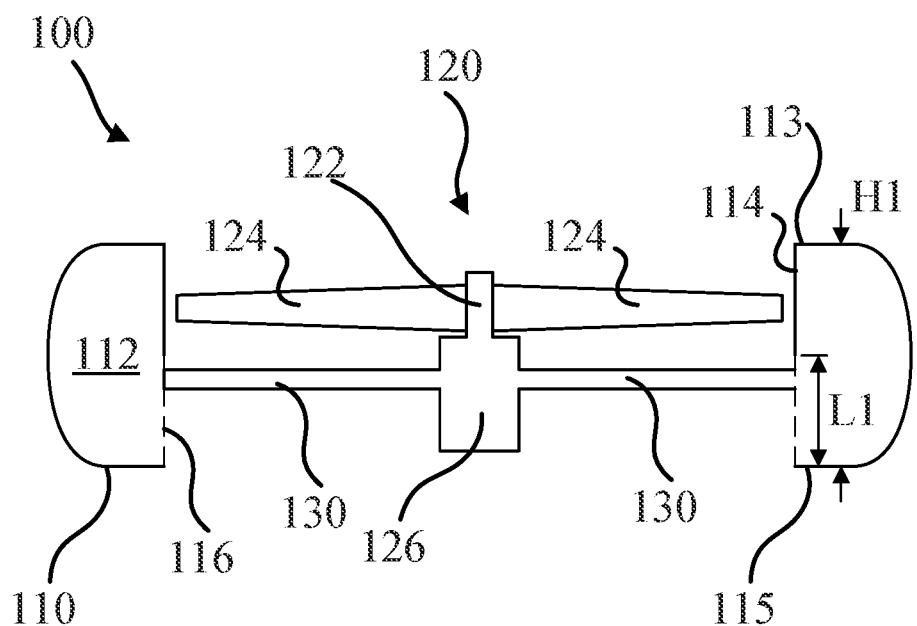
FIG. 2 illustrates a cross sectional view of an acoustic system for a UAM vehicle, in accordance with various embodiments.

Referring now to FIG. 2, a cross-section view of an acoustic system 100 for the UAM vehicle 10 from FIG. 1 is illustrated, in accordance with various embodiments. In various embodiments, the acoustic system 100 includes the shroud 110 disposed radially outward of the rotor 120. The rotor 120 includes a drive shaft 122 and rotary blades 124 and a hub 126. Any number of rotary blades 124 is within the scope of this disclosure. The drive shaft 122 and the rotary blades 124 are configured to rotate about the hub 126 to generate lift and/or thrust to propel UAM vehicle 10 from FIG. 1, in accordance with various embodiments. In various embodiments, the acoustic system 100 further comprises at least two struts 130 coupling the hub 126 to the shroud 110. The at least two struts 130 provide structural support for the rotor 120, in accordance with various embodiments.

In various embodiments, the shroud 110 may comprise a structural component of the UAM vehicle 10. For example, the shroud 110 may be configured for blade containment in a broken blade event, such as a bird strike event or the like.

In various embodiments, the shroud 110 is a non-structural component of the UAM vehicle 10 from FIG. 1. For example, the shroud 110 may be configured to increase a thrust output for the propulsion system 18 from FIG. 1 and/or to reduce a noise output from the propulsion system 18 from FIG. 1, in accordance with various embodiments. In various embodiments, the shroud 110 defines a hollow chamber 112. The shroud 110 includes a radially inner wall 114 extending from a top end 113 to a bottom end 115 defining a shroud height H1 and is annular in that it extends completely about the rotor 120 (i.e., the inner wall 114 extends 360° about the rotor 120). The radially inner wall 114 includes a perforated portion 116 (e.g., an annular structure) having a length L1 measured from the bottom end 115 in a direction defined by the radially inner wall 114 (i.e., a vertical direction). In various embodiments, the length L1 is between 0.4 H1 and H1, or between 0.5 H1 and H1, or between 0.6 H1 and H1. In various embodiments, the perforated portion 116 may be entirely below (i.e., vertically below) rotary blades 124. In this regard, communities around the UAM vehicle 10 from FIG. 1 will likely be below the rotor 120 during operation of UAM vehicle 10. In various embodiments, when the rotor 120 is configured for variable angles of attack (e.g., 360 degrees of freedom or the like), the length L1 may be equal to H1. In this regard, whether the rotor 120 is angled downward or upward, noise radiation may be attenuated via hollow chamber 112, in accordance with various embodiments.

In various embodiments, the hollow chamber 112 is in fluid communication with the external atmosphere through the perforated portion 116 of the radially inner wall 114 (i.e., there are no perforations in the remainder of the shroud 110). In this regard, sound radiation from the rotor 120 entering the hollow chamber 112 may be out of phase with the sound radiation exiting the hollow chamber 112, resulting in a reduction in noise below the rotor 120.

In various embodiments, the acoustic system 100 may include a perforated screen, a backskin and a honeycomb core disposed between the backskin and the perforated screen. The depth of the honeycomb core may be a function of a frequency of noise that is being attenuated. For example, higher frequencies may have honeycomb cores with less depth relative to lower frequencies. In various embodiments, the acoustic system 100 disclosed herein targets low frequencies of rotor 120. In this regard, a large depth of a honeycomb core may provide noise reduction for rotor 120 (i.e., noise produced by rotor 120 would be reduced relative to noise without the acoustic system 100). However, the large depth may not be feasible and/or may add to weight and cost of an attenuation system. Thus, both an acoustic system 100 with a perforated screen, a backskin and a honeycomb core, and an acoustic system 100 without a perforated screen, a backskin, and a honeycomb core are within the scope of this disclosure.

In various embodiments, the hollow chamber 112 is configured as a resonating chamber or cavity. In this regard, at least a portion of the noise generated from the rotor 120 may be configured to resonate within the hollow chamber 112. In various embodiments, a volume of the hollow chamber 112 may be sized and configured based on a desired target frequency. For example, the lower the target frequency for noise reduction, the greater the volume of the hollow chamber 112, in accordance with various embodiments.

Figure 3:
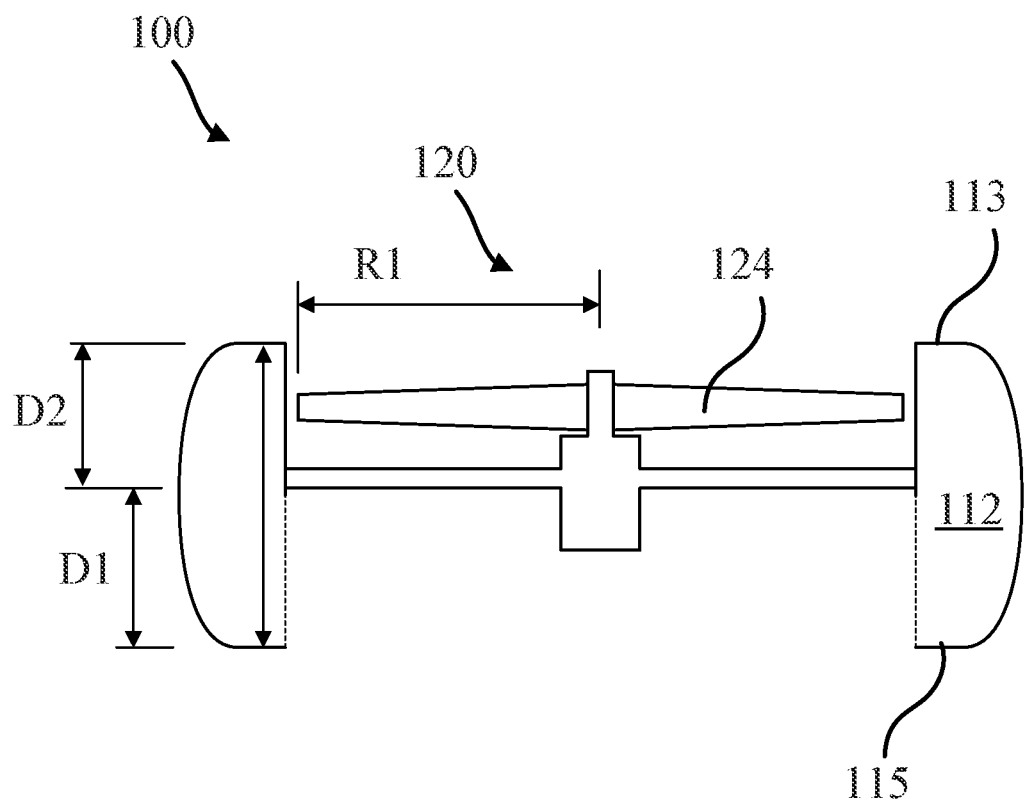
FIG. 3 illustrates a cross sectional view of an acoustic system for a UAM vehicle, in accordance with various embodiments.

Referring now to FIG. 3, the acoustic system 100 during operation of the rotor 120 is illustrated, in accordance with various embodiments. During operation, the rotor 120 may be configured to displace air in a downward direction (i.e., towards a ground surface). In various embodiments, a distance D1, measured vertically from struts 130 to bottom end 115 may be extended to provide a duct geometry within hollow chamber 112 to facilitate enhanced propagation of sound waves within the hollow chamber 112 (i.e., a muffler-type effect). In various embodiments, top end 113 and bottom end 115 from may be substantially equidistant from struts 130 as illustrated in FIG. 2. In various embodiments, the distance D1 between struts 130 and bottom end 115 may be greater than a distance D2 from struts 130 to top end 113 of shroud 110. In various embodiments, distance D1 may be substantially longer than distance D2. For example, in various embodiments, distance D1 may be less than or equal to a radius R1 of rotary blades 124 of rotor 120, whereas D2 may be approximately 0.5 R1. In various embodiments, the height (D1+D2) of the shroud 110 may be up to a diameter (2*R1) of rotary blades 124 of rotor 120.

Figure 4:
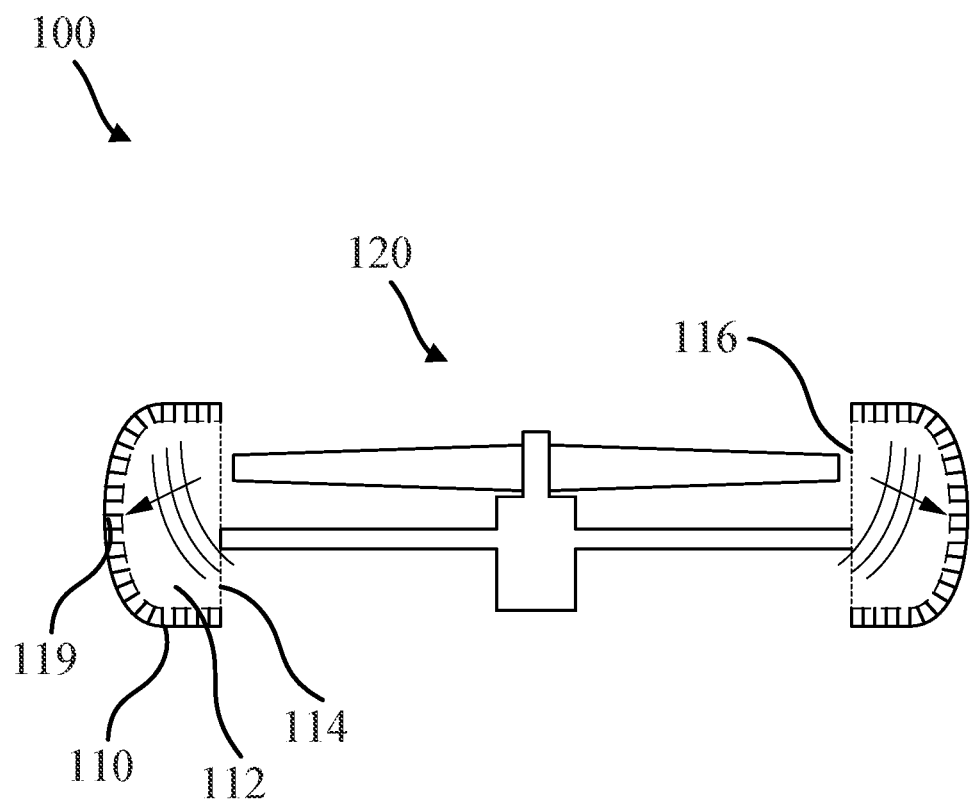
FIG. 4 illustrates a cross-sectional view of an acoustic system for a UAM vehicle, in accordance with various embodiments.

Referring now to FIG. 4, a cross-sectional view of the acoustic system 100 is illustrated during operation of the rotor 120, in accordance with various embodiments. In various embodiments, the acoustic system 100 may be configured for noise attenuation. In this regard, a portion of noise generated from the rotor 120 may form a standing wave pattern and thus be trapped within the hollow chamber 112, in accordance with various embodiments. For example, the acoustic system 100 may further comprise an acoustic liner 119 disposed on an internal surface of shroud 110, in accordance with various embodiments. The acoustic liner 119 may comprise an absorbent material configured to attenuate noise (e.g., foam, vinyl, rubber, etc.). In various embodiments, the acoustic liner 119 includes a perforated sheet.

In various embodiments, the hollow chamber 112 is defined by the radially inner wall 114 and the acoustic liner 119. In various embodiments, the hollow chamber 112 is defined by the perforated portion 116 and the acoustic liner 119. In various embodiments, during operation of the rotor 120, sound waves may propagate radially outward, through the perforated portion 116 of the radially inner wall 114 for shroud 110, into the hollow chamber 112, and may be at least partially absorbed by acoustic liner 119. In this regard, the acoustic system 100 may facilitate significant noise reduction for a UAM vehicle 10 from FIG. 1, in accordance with various embodiments.

Benefits, other advantages, and solutions to problems have been described herein with regard(s) to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An acoustic system for an Urban Air Mobility (UAM) vehicle, the acoustic system comprising:
   a first shroud configured to be disposed around a rotor of the UAM vehicle, the first shroud comprising:
   a top end;
   a bottom end;
   a radially inner wall extending from the top end to the bottom end, the radially inner wall configured to be spaced radially outward from a blade tip of a rotary blade of the rotor, the radially inner wall including a perforated portion;
   an arcuate portion extending from the top end to the bottom end and radially outward from the radially inner wall;

a hollow chamber defined by an internal surface of the top end, the bottom end, the arcuate portion, and the radially inner wall, wherein the hollow chamber is configured to act as a resonating chamber; and an acoustic liner coupled to the internal surface of the arcuate portion of the first shroud.

2. The acoustic system of claim 1, wherein the perforated portion extends from the bottom end of the first shroud toward the top end of the first shroud.

3. The acoustic system of claim 2, wherein a height of the perforated portion is between 0.5 times a radially inner wall height and 1 times the radially inner wall height.

4. The acoustic system of claim 2, wherein a height of the first shroud is up to a diameter of the rotor.

5. The acoustic system of claim 1, further comprising a second shroud configured to be disposed around a second rotor and a third shroud configured to be disposed around a third rotor, the second shroud and the third shroud having a same construction as the first shroud.

6. The acoustic system of claim 5, further comprising a fourth shroud configured to be disposed around a fourth rotor, the fourth shroud having the same construction as the first shroud.

7. A rotor system for an Urban Air Mobility (UAM) vehicle, the rotor system comprising:
   a central hub;
   a drive shaft operably coupled to the central hub;
   at least two rotary blades extending radially outward from the drive shaft;
   a shroud disposed radially outward from the at least two rotary blades, the shroud being annular in shape, the shroud including a hollow chamber, the shroud comprising a radially inner wall disposed proximate a blade tip of the at least two rotary blades and an arcuate portion extending from a top end of the radially inner wall to a bottom end of the radially inner wall and radially outward from the radially inner wall, the radially inner wall including a perforated portion, wherein the hollow chamber is configured to act as a resonating chamber; and
   an acoustic liner disposed on an internal surface of the arcuate portion of the shroud.

8. The rotor system of claim 7, further comprising at least two struts extending from the central hub radially outward to the shroud.

9. The rotor system of claim 8, wherein a height of the shroud is up to a diameter of a rotary blade in the at least two rotary blades.

10. The rotor system of claim 9, wherein the perforated portion extends from the bottom end of the radially inner wall towards the top end of the radially inner wall.

11. The rotor system of claim 7, wherein the radially inner wall and the acoustic liner define the hollow chamber.

12. An Urban Air Mobility (UAM) vehicle, comprising:
   an airframe defining a cabin; and
   a propulsion system comprising a plurality of rotor systems, each rotor system including:
     a central hub;
     a drive shaft operably coupled to the central hub;
     at least two rotary blades configured to rotate about the central hub; and
     a shroud having an acoustic system, the acoustic system configured for noise attenuation, the shroud comprising a hollow chamber, the shroud comprising a radially inner wall disposed proximate a blade tip of the at least two rotary blades and an arcuate portion extending from a top end of the radially inner wall to a bottom end of the radially inner wall and radially outward from the radially inner wall, wherein the hollow chamber is configured to act as a resonating chamber; and
     an acoustic liner disposed on an internal surface of the arcuate portion of the shroud.

13. The UAM vehicle of claim 12, wherein the radially inner wall including a perforated portion.

14. The UAM vehicle of claim 12, wherein the shroud is disposed radially outward of the at least two rotary blades, the shroud being annular in shape.

15. The UAM vehicle of claim 12, further comprising a plurality of support arms, each support arm configured to structurally support each rotor system in the plurality of rotor systems.

16. The UAM vehicle of claim 15, wherein the plurality of support arms extend outward from the airframe to the plurality of rotor systems.

\* \* \* \* \*